(12) United States Patent
Miyamoto et al.

(10) Patent No.: US 6,554,890 B2
(45) Date of Patent: Apr. 29, 2003

(54) WATER BASED INK COMPOSITION FOR WRITING INSTRUMENT

(75) Inventors: Masaru Miyamoto, Yokohama (JP); Tadashi Kamagata, Yokohama (JP)

(73) Assignee: Mitsubishi Pencil Kabushiki Kaisha, Tokyo (JP)

(*) Notice: Subject to any disclaimer, the term of this patent is extended or adjusted under 35 U.S.C. 154(b) by 0 days.

(21) Appl. No.: 09/870,863

(22) Filed: May 30, 2001

(65) Prior Publication Data

US 2002/0011180 A1 Jan. 31, 2002

(30) Foreign Application Priority Data

Jun. 1, 2000 (JP) .................................. 2000-164973

(51) Int. Cl.$^7$ ............................................. C09D 11/00
(52) U.S. Cl. ............................. 106/31.58; 106/31.02; 106/31.86
(58) Field of Search ..................... 106/31.02, 31.58, 106/31.86

(56) References Cited

U.S. PATENT DOCUMENTS

| | | | | |
|---|---|---|---|---|
| 4,421,560 A | * | 12/1983 | Kito et al. | 106/31.2 |
| 6,123,757 A | * | 9/2000 | Yang et al. | 106/31.02 |
| 6,153,001 A | * | 11/2000 | Suzuki et al. | 106/31.65 |
| 6,261,347 B1 | * | 7/2001 | Moreland | 106/31.02 |
| 2002/0073893 A1 | * | 6/2002 | Campbell | 106/31.86 |

FOREIGN PATENT DOCUMENTS

| | | | | |
|---|---|---|---|---|
| JP | 56-81377 | 7/1981 | | C09D/11/18 |
| JP | 63-223078 | 9/1988 | | C09D/11/16 |
| JP | 8-283645 | 10/1996 | | C09D/11/16 |

* cited by examiner

Primary Examiner—Mark L. Bell
Assistant Examiner—Veronica F. Faison
(74) Attorney, Agent, or Firm—Darby & Darby

(57) ABSTRACT

A water based ink composition for a writing instrument containing at least one selected from the group consisting of a polyoxyethylene alkyl ether phosphate and salts thereof and further containing a colorant, a perfume and water, which is less liable to cause feathering of the lines and in which a perfume is dispersed and retained in an aqueous medium in a stable state and the fragrance lasts long.

2 Claims, No Drawings

WATER BASED INK COMPOSITION FOR WRITING INSTRUMENT

BACKGROUND OF THE INVENTION

1. Field of the Invention

The present invention relates to a water based ink composition for a writing instrument which sheds fragrance in writing and which imparts faint fragrance as well to drawn lines.

2. Description of the Related Art

In general, perfumes are oil-soluble, and an emulsifier or a dispersant which forms protective colloid is required in order to emulsify or disperse them in water. Water-soluble resins or surfactants are used as the protective colloid described above. In almost all water-soluble resins, however, use of a necessary and sufficient amount of a resin required for dispersing a perfume raises a viscosity of the liquid and makes it inadequate for an ink for a writing instrument.

On the other hand, an emulsion which is prepared using a surfactant in an amount enough for emulsifying a perfume in a stable state is reduced in the surface tension to a large extent, so that an ink prepared using the emulsion has the practical problem that drawn lines are liable to cause feathering. Further, an ink prepared merely emulsifying and dispersing a perfume by the method described above involves the problem that fragrance is shed immediately after writing but the fragrance is lost soon thereafter and can not be retained for long time (no durability).

Those which have so far been known as ink compositions for a writing instrument containing a perfume shedding fragrance in writing include, for example, inks for a ball point pen comprising dyes, resins and organic solvents, wherein a perfume having a compatibility with the above inks is added (Japanese Patent Application Laid-Open No. Sho 56-81377), perfume-containing water based inks blended with a perfume, maltosyl cyclodextrin (MCD), a colorant and water (Japanese Patent Application Laid-Open No. Sho 63-223078) and water based ink compositions for a writing instrument comprising a colorant, a perfume, a partially sulfonated polyester resin and water (Japanese Patent Application Laid-Open No. Hei 8-283645).

However, the ink composition disclosed in Japanese Patent Application Laid-Open No. Sho 56-81377 involves the problem that even if adding a perfume having compatibility, feathering is caused on a paper surface in writing. Also, the ink composition disclosed in Japanese Patent Application Laid-Open No. Sho 63-223078 is prepared by including a perfume in MCD and adding the above inclusion compound to a water based ink, and therefore the perfume contained in this water based ink tends to easily be separated with the passage of time, particularly with the passage of time at a high temperature, so that the ink composition involves problems in dispersibility of the perfume and durability of fragrance. Further, the ink composition disclosed in Japanese Patent Application Laid-Open No. Hei 8-283645 involves the problem that fragrance is shed immediately after writing but the fragrance is lost thereafter and can not be retained for long time (no durability).

The present invention intends to solve the problems of the conventional techniques described above, and an object thereof is to provide a water based ink composition for a writing instrument which is less liable to cause feathering and has durability of fragrance and in which a perfume is dispersed and retained in an aqueous medium in a stable state.

SUMMARY OF THE INVENTION

Intensive researches repeated by the present inventors regarding the problems of the conventional techniques described above have resulted in successfully obtaining a water based ink composition for a writing instrument which meets the object described above by adding a specific ink component to a water based ink composition for a writing instrument comprising a colorant and a perfume, and thus the present invention has been completed.

That is, the water based ink composition for a writing instrument of the present invention contains at least one selected from the group consisting of a polyoxyethylene alkyl ether phosphate and salts thereof and further contains a colorant, a perfume and water.

DETAILED DESCRIPTION OF THE PREFERRED EMBODIMENTS

The embodiment of the present invention shall be explained below in detail.

The water based ink composition for a writing instrument of the present invention contains at least one selected from the group consisting of a polyoxyethylene alkyl ether phosphate and salts thereof and further contains a colorant, a perfume and water.

The at least one selected from the group consisting of a polyoxyethylene alkyl ether phosphate and salts thereof which is used in the present invention is used for the purposes of a feathering inhibitor, a fragrance durability-improving agent and inhibiting separation of the perfume.

The polyoxyethylene alkyl ether phosphate and salts thereof have a structure and properties close to naturally occurring lecithin and cephalin. The polyoxyethylene alkyl ether phosphate and salts thereof have an excellent solubility, emulsifiability and dispersability due to characteristics of phosphoric acid group that is hydrophilic.

Examples of the preferably commercially available polyoxyethylene alkyl ether phosphates and salts thereof include as a lauryl ether type, DLP-10, TLP-4 (manufactured by Nikko Chemicals Co., Ltd.), Phosphanol ML-220 and RD-510Y(manufactured by Toho Chemical Industry Co., Ltd.); as a cetyl ether type, TCP-5 (manufactured by Nikko Chemicals Co., Ltd.); as an oleyl ether type, DOP-8N (manufactured by Nikko Chemicals Co., Ltd.), Phosphanol RB-410, RB-701, RD-720N and RB-520 (manufactured by Toho Chemical Industry Co, Ltd.); as a stearyl ether type, Phosphanol RL-210 and RL-310 (manufactured by Toho Industry Chemical Co, Ltd.); as an alkyl ether type, DDP-2, DDP-4, DDP-6, DDP-8, DDP-10, TDP-2, TDP-6, TDP-10 (manufactured by Nikko Chemicals Co., Ltd.), Phosphanol RS-410, RS-610 and RS-710 (manufactured by Toho Chemical Industry Co, Ltd.).

In the present invention, a mixture of at least one selected from the group consisting of the above-mentioned polyoxyethylene alkyl ether phosphates and salts thereof has a content of 0.01 to 10% by weight, preferably 0.5 to 5% by weight based on the total amount of the ink composition.

If a content of the mixture of at least one selected from the group consisting of the above-mentioned polyoxyethylene alkyl ether phosphates and salts thereof is less than 0.01% by weight based on the total amount of the ink composition, the feathering-inhibiting effect, the fragrance durability-improving effect and the perfume separation-inhibiting effect are inferior, and the effects of the present invention can not be displayed. On the other hand, if the content exceeds 10% by weight, the ink is less liable to be dried when transferred onto a paper face, and when it is used for a ball point pen, a discharge amount of the ink from the pen tip is reduced. Accordingly, the such contents are not preferred.

The colorant used in the present invention includes, for example, pigments and water soluble dyes.

The pigment shall not specifically be restricted and includes at least one selected from inorganic and organic pigments, titanium oxide and pseudo pigments obtained by coloring resin emulsions with dyes, all of which are conventionally used for a water based ink.

The inorganic pigments include, for example, carbon black, metal powder and the like.

The organic pigments include, for example, azo lakes, insoluble azo pigments, chelate azo pigments, phthalocyanine pigments, perylene and perinone pigments, anthraquinone pigments, quinacridone pigments, dye lakes, nitro pigments and nitroso pigments.

To be specific, included are inorganic pigments such as carbon black, titanium black, zinc oxide, red iron oxide, chromium oxide, mica titan, black iron oxide, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder and bronze powder, C. I. Pigment Blue 1, C. I. Pigment Blue 15, C. I. Pigment Blue 17, C. I. Pigment Blue 27, C. I. Pigment Red 5, C. I. Pigment Red 22, C. I. Pigment Red 38, C. I. Pigment Red 48, C. I. Pigment Red 49, C. I. Pigment Red 53, C. I. Pigment Red 57, C. I. Pigment Red 81, C. I. Pigment Red 104, C. I. Pigment Red 146, C. I. Pigment Red 245, C. I. Pigment Yellow 1, C. I. Pigment Yellow 3, C. I. Pigment Yellow 12, C. I. Pigment Yellow 13, C. I. Pigment Yellow 14, C. I. Pigment Yellow 17, C. I. Pigment Yellow 34, C. I. Pigment Yellow 55, C. I. Pigment Yellow 74, C. I. Pigment Yellow 83, C. I. Pigment Yellow 95, C. I. Pigment Yellow 166, C. I. Pigment Yellow 167, C. I. Pigment Orange 5, C. I. Pigment Orange 13, C. I. Pigment Orange 16, C. I. Pigment Violet 1, C. I. Pigment Violet 3, C. I. Pigment Violet 19, C. I. Pigment Violet 23, C. I. Pigment Violet 50, and C. I. Pigment Green 7.

The pseudo pigments obtained by coloring resin emulsions with dyes include, for example, those obtained by coloring resins comprising copolymers of acrylonitrile, styrene and methyl methacrylate with dyes.

Any of direct dyes, acid dyes, food colors and basic dyes can be used for the water-soluble dyes.

The direct dyes include, for example, C. I. Direct Black 17, ditto 19, ditto 22, ditto 32, ditto 38, ditto 51 and ditto 71, C. I. Direct Yellow 4, ditto 26, ditto 44 and ditto 50, C. I. Direct Red 1, ditto 4, ditto 23, ditto 31, ditto 37, ditto 39, ditto 75, ditto 80, ditto 81, ditto 83, ditto 225, ditto 226 and ditto 227, C. I. Direct Blue 1, ditto 15, ditto 71, ditto 86, ditto 106 and ditto 119.

The acid dyes include, for example, C. I. Acid Black 1, ditto 2, ditto 24, ditto 26, ditto 31, ditto 52, ditto 107, ditto 109, ditto 110, ditto 119 and ditto 154, C. I. Acid Yellow 7, ditto 17, ditto 19, ditto 23, ditto 25, ditto 29, ditto 38, ditto 42, ditto 49, ditto 61, ditto 72, ditto 78, ditto 110, ditto 127, ditto 135, ditto 141 and ditto 142, C. I. Acid Red 8, ditto 9, ditto 14, ditto 18, ditto 26, ditto 27, ditto 35, ditto 37, ditto 51, ditto 52, ditto 57, ditto 82, ditto 87, ditto 92, ditto 94, ditto 115, ditto 129, ditto 131, ditto 138, ditto 186, ditto 249, ditto 254, ditto 265 and ditto 276, C. I. Acid Violet 15 and ditto 17, C. I. Acid Blue 1, ditto 7, ditto 9, ditto 15, ditto 22, ditto 23, ditto 25, ditto 40, ditto 41, ditto 43, ditto 62, ditto 78, ditto 83, ditto 90, ditto 93, ditto 103, ditto 112, ditto 113, and ditto 158, C. I. Acid Green 3, ditto 9, ditto 16, ditto 25 and ditto 27.

A large part of the food colors is included in the direct dyes and the acid dyes, and one example of those which are not included therein includes C. I. Food Yellow 3.

The basic dyes include, for example, C. I. Basic Yellow 1, ditto 2 and ditto 21, C. I. Basic Orange 2, ditto 14 and ditto 32, C. I. Basic Red 1, ditto 2, ditto 9 and ditto 14, C. I. Basic Violet 1, ditto 3 and ditto 7, C. I. Basic Green 4, C. I. Basic Brown 12, C. I. Basic Black 2 and ditto 8.

These dyes each may be used alone or in combination of two or more kinds thereof.

A content of these colorants is 0.5 to 40% by weight, preferably 1 to 30% by weight based on the total amount of the ink composition.

The perfume used in the present invention includes, for example, those described in the following 1) to 6), and they each may be used alone or in combination of two or more kinds thereof:

1) Essential oils such as grape fruit oil, orange oil, lemon oil, lime oil, ylang ylang oil, cammomile oil, jasmin oil, hiba oil, peppermint oil, lavender oil and rosemary oil.
2) Terpenes such as α-pinene, β-pinene and limonene.
3) Alcohols such as linalool, 1-menthol, geraniol, borneol, lavandulol, hexyl alcohol, phenylethyl alcohol (Rose P), furfuryl alcohol, cyclotene, maltol, eugenol and α-phenylethanol.
4) Aldehydes such as heptanal, octanal, dodecanal, tetradecanal, hexadecanal, citral, lyral, benzaldehyde and cyclamen aldehyde.
5) Esters such as ethyl acetate, propyl acetate, amyl acetate, linallyl acetate, benzyl acetate, dimethylbenzyl-carbinyl acetate and benzyl propionate.
6) Aromatic compounds such as nootkatone, ethylpyrazine, lemon terpeneless, orange terpeneless, ethylvanillin and furfurylmercaptan.

In the present invention, capable of being used as well are mixed perfumes prepared by suitably combining the respective perfumes described above, for example, banana perfume, blueberry perfume, vanilla perfume, mint perfume, apple perfume, peach perfume, melon perfume, pineapple perfume, grape perfume, lilac perfume and jasmin perfume.

For example, the banana perfume can be prepared by suitably blending vanillin, ethylvanillin, n-hexanal, isoamyl alcohol, trans-2-hexenal, n-butanol, isoamyl acetate, butyl acetate, isobutyl acetate, diacetyl, ethyl acetate, hexyl acetate, isoamyl butyrate, isoamyl isovalerate, cis-3-hexenol, cis-3-hexenyl acetate, acetic acid, isoeugenol, ethyl butyrate and a solvent. Further, the pineapple perfume can be prepared by suitably blending benzyl acetate, orange oil 3-fold, vanillin, isoamyl acetate, isoamyl butyrate, ethyl acetate, ethyl heptanoate, ethyl hexanoate, ethyl butyrate and allyl hexanoate.

Further, capable of being used as well are commercially available various mixed perfumes, for example, vanilla perfume [Vanilla BVK-3359 (manufactured by Takasago International Corporation)], mint perfume [Mint THP-8148 (manufactured by T. Hasegawa Co., Ltd.)], banana perfume [Banana T-1510 (manufactured by Yamamoto Perfumery Co., Ltd.)] and blueberry perfume [Blueberry V-647 (manufactured by Yamamoto Perfumery Co., Ltd.)].

A content of these perfumes falls in a range of 0.01 to 10% by weight, preferably 0.1 to 6% by weight based on the total amount of the ink composition.

If a content of these perfumes is less than 0.01% by weight, fragrance does not last long and comes to be not smelt. On the other hand, if it exceeds 10% by weight, an adverse effect is exerted on the aging stability of the ink composition. Accordingly, both ranges are not preferred.

In the present invention, the perfume is used in a range of the content (0.01 to 10% by weight) described above and added preferably in an amount of 70% or less, more preferably 60% or less in terms of a weight ratio based on the at least one selected from the group consisting of the above-mentioned polyoxyethylene alkyl ether phosphates and salts thereof (one kind thereof or a mixture of two or more kinds thereof).

Setting this weight ratio makes it possible to further display the feathering inhibiting effect, the fragrance durability-improving effect and the perfume separation-inhibiting effect.

In the present invention, when the pigment notably settles down, a viscosity-controlling agent is preferably added from a viewpoint of preventing settling.

The viscosity-controlling agent used includes at least one selected from synthetic polymers, natural gums, celluloses and polysaccharides.

The synthetic high polymers include, for example, polyacrylic acid and cross-linking type copolymers thereof, polyvinyl alcohol, polyvinylpyrrolidone and derivatives thereof, and polyvinyl methyl ether and derivatives thereof. The natural rubbers and the polysaccharides include, for example, tragacanth gum, guar gum, locust bean gum and xanthan gum. The celluloses include methyl cellulose, ethyl cellulose, hydroxyethyl cellulose and carboxymethyl cellulose.

To be specific, included are commercial products such as "Junron PW-111" manufactured by Nihon Junyaku Co., Ltd., "Hiviswako 104" manufactured by Wako Pure Chemical Ind. Co., Ltd., "KELZAN", "KELZAN AR", "K1A96", "K1A112", "RHEOZAN" and "K7C233" manufactured by Sansho Co., Ltd., "JAGUAR HP-8", "JAGUAR HP-60", "RHODOPOL 23" and "RHODOPOL 50MC" manufactured by Rhone Poulenc Japan Ltd., and "Echo Gum GM" manufactured by Dainippon Pharmaceutical Co., Ltd.

A content of these viscosity-controlling agents is preferably 0.1 to 1.5% by weight based on the total amount of the ink composition. The content varies depending on the kind of the viscosity-controlling agents, and it is preferably 0.1 to 1.5% by weight in the case of the synthetic polymers and preferably 0.1 to 0.8% by weight in the case of the natural polysaccharides.

If a content of these viscosity-controlling agents is less than 0.1% by weight, the effect of adding the viscosity-controlling agent can not be exhibited. On the other hand, if it exceeds 1.5% by weight, the ink is reduced in fluidity so that writing is liable to be inferior because of the poor flowability.

Other components (optional components) which are used for an ink composition for a writing instrument can further be added, if necessary, to the ink composition of the present invention as long as the effects of the present invention are not damaged.

Capable of being suitably selected and used as the other usable components are, for example, solvents including water-soluble polyhydric alcohols such as ethylene glycol, propylene glycol and glycerin, cellosolves such as ethylene glycol monomethyl ether (methyl cellosolve) and ethylene glycol monoethyl ether (ethyl cellosolve), carbitols such as diethylene glycol monomethyl ether (methyl carbitol) and diethylene glycol monoethyl ether (ethyl carbitol) and glycol ether esters such as ethylene glycol monoethyl ether acetate; pH adjusting agents including ammonia, urea, monoethanolamine, diethanolamine, triethanolamine, alkalin metal salts of carbonic acid and phosphoric acid such as sodium tripolyphosphate and sodium carbonate, and hydroxides of alkalin metals such as sodium hydroxide; preservatives or fungicides including phenol, sodium omadine, sodium pentachlorophenol, 1,2-benzisothiazoline-3-one, 2,3,5,6-tetrachloro-4-(methylsulfonyl)pyridine, alkalin metal salts of benzoic acid, sorbic acid and dehydroacetic acid such as sodium benzoate, and benzimidazole base compounds; rust preventives such as benzotriazole, dicyclohexylammonium nitrite, diisopropyl-ammonium nitrite and tolyltriazole; lubricants, wetting agents, and defoaming agents comprising; anionic surfactants such as carbonic acids and sulfonic acids; cationic surfactants such as ammonium salts and amines; other amphoteric surfactants; and nonionic surfactants.

Water used in the present invention includes purified water and ion-exchanged water, and a content thereof is a remainder (balance) of the total content of the respective components described above.

The water based ink composition for a writing instrument of the present invention can suitably used for a ball point pen, a brush pen, a felt tip pen and a marker.

In the water based ink composition for a writing instrument of the present invention thus constituted, in order to solve the respective problems described above caused when using the perfume, added as well as the colorant, the perfume and water is at least one selected from the group consisting of the polyoxyethylene alkyl ether phosphates and salts thereof which has a function as a feathering inhibitor, a function as a fragrance durability-improving agent and a function for inhibiting separation of the perfume, whereby exhibited are specific actions that the lines are less liable to cause feathering and fragrance is durable and that the perfume is dispersed and retained in an aqueous medium in a stable state (these points shall further be explained in detail in examples described later)

EXAMPLES

The present invention shall be explained below in detail with reference to examples and comparative examples, but it is a matter of course that the present invention shall not be restricted to the examples described below.

Examples 1 to 10 and Comparative Examples 1 to 3

Water based ink compositions for a writing instrument were prepared according to blending formation shown in the following Table 1.

The water based ink compositions obtained in Examples 1 to 10 and Comparative Examples 1 to 3 were evaluated for feathering of the ink, fragrance, separation of the perfume, coagulation of the pigment and writing feeling by the following evaluation methods. Ball point pens for evaluation were prepared to evaluate feathering of the ink, fragrance and writing feeling.

The results thereof are shown in the following Table 1.
Preparation of Ball Point Pens for Evaluation The respective inks were charged into refills comprising a polypropylene-made ink reservoir with an inner diameter of 4.0 mm and a length of 115 mm having no feed and a stainless steel-made tip with a ball having a diameter of 0.7 mm to prepare ball point pens for evaluation (UM-100 manufactured by Mitsubishi Pencil K. K.).

Evaluation Method of Feathering

The ball point pen was used to write on a paper face (wood free paper) and sensorily evaluated according to the following evaluation criteria.

Evaluation Criteria:
○: no feathering and clear lines
Δ: feathering observed and unclear lines
X: very unclear lines due to feathering Evaluation Method of Fragrance:

The ball point pen was used to write on a paper face (wood free paper) and sensorily evaluated according to the following evaluation criteria.

Evaluation Criteria
○: smell in writing, and the lines smell even after 5 hours

Evaluation Method of Writing Feeling:

The ball point pen was used to write on a paper face (wood free paper) and evaluated the writing feeling according to the following evaluation criteria.

Evaluation Criteria:

◎: very smooth writing feeling
○: smooth writing feeling
Δ: writing feeling having a little poor smoothness
X: very heavy writing feeling, and unpleasant feeling such as scratching is given (unusable level)

TABLE 1

(% by weight)

| | | Example | | | | | | | | | | Comparative Example | | |
|---|---|---|---|---|---|---|---|---|---|---|---|---|---|---|
| | Remark | 1 | 2 | 3 | 4 | 5 | 6 | 7 | 8 | 9 | 10 | 1 | 2 | 3 |
| Blending Formation | | | | | | | | | | | | | | | |
| Colorant | | | | | | | | | | | | | | | |
| Blue pigment | (1) | 10.0 | 10.0 | | | | | | 10.0 | | | 10.0 | | |
| Yellow pigment | (2) | | | 10.0 | | | | | | 10.0 | | | 10.0 | |
| White pigment | (3) | | | | 20.0 | 20.0 | | 2.0 | | | 20.0 | | | 10.0 |
| Pearl pigment | (4) | | | | | | 5.0 | | | | | | | |
| Lubricant | (5) | 0.5 | 0.5 | 0.5 | 0.5 | 0.5 | 0.5 | 0.5 | 0.5 | | 0.5 | 0.5 | 0.5 | 0.5 |
| Propylene glycol | — | | 5.0 | 5.0 | 5.0 | 5.0 | 5.0 | 5.0 | 5.0 | 5.0 | 5.0 | 5.0 | 5.0 | 5.0 |
| Xanthan gum | (6) | | | 0.1 | 0.1 | 0.1 | 0.1 | 0.1 | | | 0.1 | | | 0.1 |
| Polyoxyethylene | (7) | 5.0 | 10.0 | 5.0 | | | | | | 5.0 | 3.0 | | | |
| alkylether phosphate | (8) | | | | 5.0 | 5.0 | 5.0 | | | | | | | |
| and salts thereof | (9) | | | | | | | 5.0 | 5.0 | | 3.0 | | | |
| Perfume | | | | | | | | | | | | | | |
| Perfume A | (10) | | | 1.0 | | | 1.0 | | | 1.0 | | | 1.0 | |
| Perfume B | (11) | 1.0 | | | | 1.0 | | 1.0 | | | | 1.0 | | |
| Perfume C | (12) | | | | 1.0 | | 1.0 | | 1.0 | | 1.0 | | | 1.0 |
| Perfume D | (13) | | 3.0 | | | | | | | | | | | |
| Water (purified water) | — | 78.5 | 71.5 | 78.4 | 68.4 | 68.4 | 83.4 | 86.4 | 78.5 | 79.0 | 67.4 | 83.5 | 83.5 | 83.4 |
| Evaluation | | | | | | | | | | | | | | | |
| Feathering | | ○ | ○ | ○ | ○ | ○ | ○ | ○ | ○ | ○ | ○ | X | Δ | ○ |
| Fragrance | | ○ | ○ | ○ | ○ | ○ | ○ | ○ | ○ | ○ | ○ | X | X | X |
| Separation of perfume | | ○ | ○ | ○ | ○ | ○ | ○ | ○ | ○ | ○ | ○ | X | X | Δ |
| Coagulation of pigment | | ○ | ○ | ○ | ○ | ○ | ○ | ○ | ○ | ○ | ○ | X | X | X |
| Writing feeling | | ◎ | ◎ | ◎ | ◎ | ◎ | ◎ | ◎ | ◎ | ○ | ◎ | ○ | ○ | ○ |

X: smell in writing, but the lines do not smell after 5 hours

Evaluation Method of Separation of the Perfume:

The respective inks were tightly sealed in a vessel and left standing in a constant temperature chamber of 50° C. for 7 days, and then it was left cooling to evaluate the state of the inks according to the following evaluation criteria.

Evaluation Criteria:
○: no change from before the test
X: perfume separated

Evaluation Method of Coagulation of the Pigment:

The respective inks were tightly sealed in a vessel and left standing at room temperature for one week, and then it was passed through a sieve of 100 μm and evaluated according to the following evaluation criteria. This pigment was evaluated for coagulation in order to evaluate a dispersion stability of the pigment.

Evaluation Criteria:
○: no residue
X: the ink is hard to pass through the sieve or residue was present on the sieve The remarks shown in Table 1 mean the followings:
(1) Phthalocyanine blue (Chromofine Blue 4965 manufactured by Dainichiseika Color & Chemicals MFG. Co., Ltd.)
(2) Lacqutimine color (Golden Yellow FL2R Conc manufactured by Dainichiseika Color & Chemicals MFG. Co., Ltd.)
(3) Titanium oxide: Tipure R-900 (manufactured by Du Pont Co., Ltd.)
(4) Iriodin 303 Royal Gold (manufactured by Merck Japan, Ltd.)
(5) Potassium oleate
(6) KELZAN (manufactured by Sansho Co., Ltd.)
(7) RD-510Y (Toho Chemical Industry Co., Ltd.)
(8) RB-410 (Toho Chemical Industry Co., Ltd)
(9) RS-610 (Toho Chemical Industry Co., Ltd)
(10) Banana perfume [Banana T-1510 (manufactured by Yamamoto Perfumery Co., Ltd.)
(11) Blueberry perfume [Blueberry V-647 (manufactured by Yamamoto Perfumery Co., Ltd.)
(12) Vanilla perfume [Vanilla BVk-3359 (manufactured by Takasogo International Corporation)

(13) Mint perfume [Mint THP-8148 (manufactured by T. Hasegawa Co., Ltd.)

Consideration of Table 1

As apparent from the results shown in Table 1 described above, it has been confirmed that in Examples 1 to 10 falling in the scope of the present invention, feathering of the ink is not observed and fragrance lasts long as compared with Comparative Examples 1 to 3 falling outside the scope of the present invention and that separation of the perfume and coagulation of the pigment are not caused and very smooth writing feeling is gained.

In contrast with this, Comparative Examples 1 to 3 are cases in which at least one selected from the group consisting of the polyoxyethylene alkyl ether phosphates and salts thereof which are the essential components in the present invention and have a function as a feathering inhibitor, a function as a fragrance durability-improving agent and a function for inhibiting separation of the perfume are not contained, and it has been confirmed that in these cases, all evaluation items of feathering of the ink, fragrance, separation of the perfume and coagulation of the pigment can not be satisfied.

What is claimed is:

1. A water based ink composition for a writing instrument containing at least one selected from the group consisting of a polyoxyethylene alkyl ether phosphate and salts thereof and further containing a colorant, a perfume and water.

2. The water based ink composition of claim 1, wherein the water based ink composition comprises 0.01 to 10% by weight of polyoxyethylene alkyl ether phosphates, salts thereof, or mixtures thereof, based upon 100% total weight of water based ink composition.

* * * * *